(12) United States Patent
Lutz

(10) Patent No.: US 9,931,795 B2
(45) Date of Patent: Apr. 3, 2018

(54) METHOD OF LIQUID RESIN INFUSION OF A COMPOSITE PREFORM

(71) Applicant: Spirit Aerosystems, Inc., Wichita, KS (US)

(72) Inventor: Andreas Lutz, Graz (AU)

(73) Assignee: Spirit AeroSystems, Inc., Wichita, KS (US)

( * ) Notice: Subject to any disclaimer, the term of this patent is extended or adjusted under 35 U.S.C. 154(b) by 706 days.

(21) Appl. No.: 14/508,402

(22) Filed: Oct. 7, 2014

(65) Prior Publication Data
US 2015/0102535 A1  Apr. 16, 2015

(30) Foreign Application Priority Data
Oct. 11, 2013 (GB) ..................... 13181342

(51) Int. Cl.
| | |
|---|---|
| *B29C 70/44* | (2006.01) |
| *B29C 70/54* | (2006.01) |
| *B29K 63/00* | (2006.01) |
| *B29K 105/08* | (2006.01) |

(52) U.S. Cl.
CPC .......... *B29C 70/443* (2013.01); *B29C 70/547* (2013.01); *B29K 2063/00* (2013.01); *B29K 2105/0872* (2013.01)

(58) Field of Classification Search
None
See application file for complete search history.

(56) References Cited

U.S. PATENT DOCUMENTS

| | | | | |
|---|---|---|---|---|
| 4,942,013 | A * | 7/1990 | Palmer | B29C 43/3642 156/285 |
| 2008/0230652 | A1* | 9/2008 | Biornstad | B29C 53/587 244/120 |

* cited by examiner

*Primary Examiner* — Monica Huson
(74) *Attorney, Agent, or Firm* — Hovey Williams LLP

(57) ABSTRACT

An assembly and method for infusing composite material with liquid resin to form a composite part with a smooth outer mold line (OML) surface and a complex inner mold line (IML) surface. The method may include placing a flow media into a deepest tier of a two-tiered recess in a rigid tool, placing a perforated caul sheet into a shallowest tier of the two-tiered recess, and placing uninfused composite material over the perforated caul sheet. Next, the method may include placing an impermeable membrane over the composite material and sealing the impermeable membrane to the rigid tool. Finally, the method may include vacuuming air from a vacuum port of the impermeable membrane to compress the impermeable membrane toward the composite material and the rigid tool, thus pull liquid resin from a resin reservoir, through the flow media, through the perforations of the caul sheet, and throughout the composite material.

17 Claims, 5 Drawing Sheets

METHOD OF LIQUID RESIN INFUSION OF A COMPOSITE PREFORM

RELATED APPLICATIONS

This application claims priority benefit of a United Kingdom application entitled, "Method of Liquid Resin Infusion of a Composite Preform," United Kingdom Patent Application No. 1318134.2, filed Oct. 11, 2013 and incorporated by reference herein in its entirety.

BACKGROUND

Composite parts such as aircraft-wings or nacelles may be fabricated via liquid resin infusion of an uncured, uninfused composite preform or composite fiber. Liquid resin infusion may include the steps of placing the composite preform on a rigid mold or tooling and then covering the composite preform with an impermeable membrane, such as a semi-flexible vacuum bag material sealed to the tool around the composite preform. Liquid resin may be located in a reservoir between the tool and the vacuum bag or otherwise fluidly coupled with the composite preform. A flow media, such as a resin distribution mesh, may be located between the composite preform and the vacuum bag to aid in evenly distributing the resin throughout the composite preform. Then vacuum is applied, removing atmosphere from between the vacuum bag and the tool, causing the liquid resin to be pulled through the resin distribution mesh and the composite preform while the vacuum bag compresses toward the tool and thus applies compressive force to the composite preform. The compressed, liquid resin-infused composite preform is then cured into a rigid composite part.

Rigid composite parts may have two opposing surfaces often referred to as an inner mold line (IML) and an outer mold line (OML). In aerospace, the OML is often on an outer surface of an aircraft and the IML is on an inner surface of the aircraft. Because the outer surface of the aircraft must be smooth and aerodynamic, the mold or tool is often designed for the OML, with the distribution mesh and then the vacuum bag being placed over the IML. However, some complex composite parts, such as wing frame stringers integral with a wing skin, may require a number of tooling features on the IML. The tooling features for holding the stringers and various other integrated components in place on the IML can get in the way of the resin distribution mesh. Therefore, it may be desirable to place the resin distribution mesh on the OML. However this often results in the flow media or resin distribution mesh imprinting onto the OML surface of the finished rigid composite part, leaving a wavy surface finish that is not smooth and aerodynamic.

SUMMARY

Embodiments of the present invention solve the above described problems by providing an assembly and method for infusing composite material with a liquid resin using a perforated caul sheet placed into two-tiered recesses of a rigid tool or mold. Specifically, the assembly may include the rigid tool, an impermeable membrane, a flow media, and the caul sheet. The rigid tool may have two-tiered recesses formed therein, including a first recessed portion and a second recessed portion located inward of the first recessed portion. The second recessed portion may extend deeper into the rigid tool than the first recessed portion. Flow channels fluidly coupled with a resin source or resin reservoir having liquid resin therein may be etched into the second recessed portion. The impermeable membrane may have at least one vacuum port formed therein. The caul sheet may be perforated, may have holes formed therethrough, and/or may be made of a porous material. The flow media and caul sheet may be sized and configured to rest in one of the recesses of the rigid tool.

A method of infusing composite material with liquid resin to form a composite part may include the steps of placing the flow media into the second recessed portion of the rigid tool, placing the caul sheet over the flow media and into the first recessed portion of the rigid tool, and placing the composite material over the caul sheet. In some embodiments of the invention, the composite material may include composite skin and composite stringers held in place by rigid tooling components. Next, the method may include placing the impermeable membrane over the composite material and hermetically sealing the impermeable membrane to the rigid tool around a periphery of the composite material. Finally, the method may include vacuuming air or atmosphere through the vacuum port from between the impermeable membrane and the rigid tool. Vacuum may be applied by an amount sufficient to compress the impermeable membrane toward the composite material and the rigid tool. This applied vacuum may also pull the liquid resin from the resin reservoir, through the flow media, through the holes or perforations of the caul sheet, and throughout the composite material.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of embodiments of the invention and the accompanying drawing figures.

BRIEF DESCRIPTION OF THE DRAWING FIGURES

Embodiments of the present invention are described in detail below with reference to the attached drawing figures, wherein.

Figure 1:
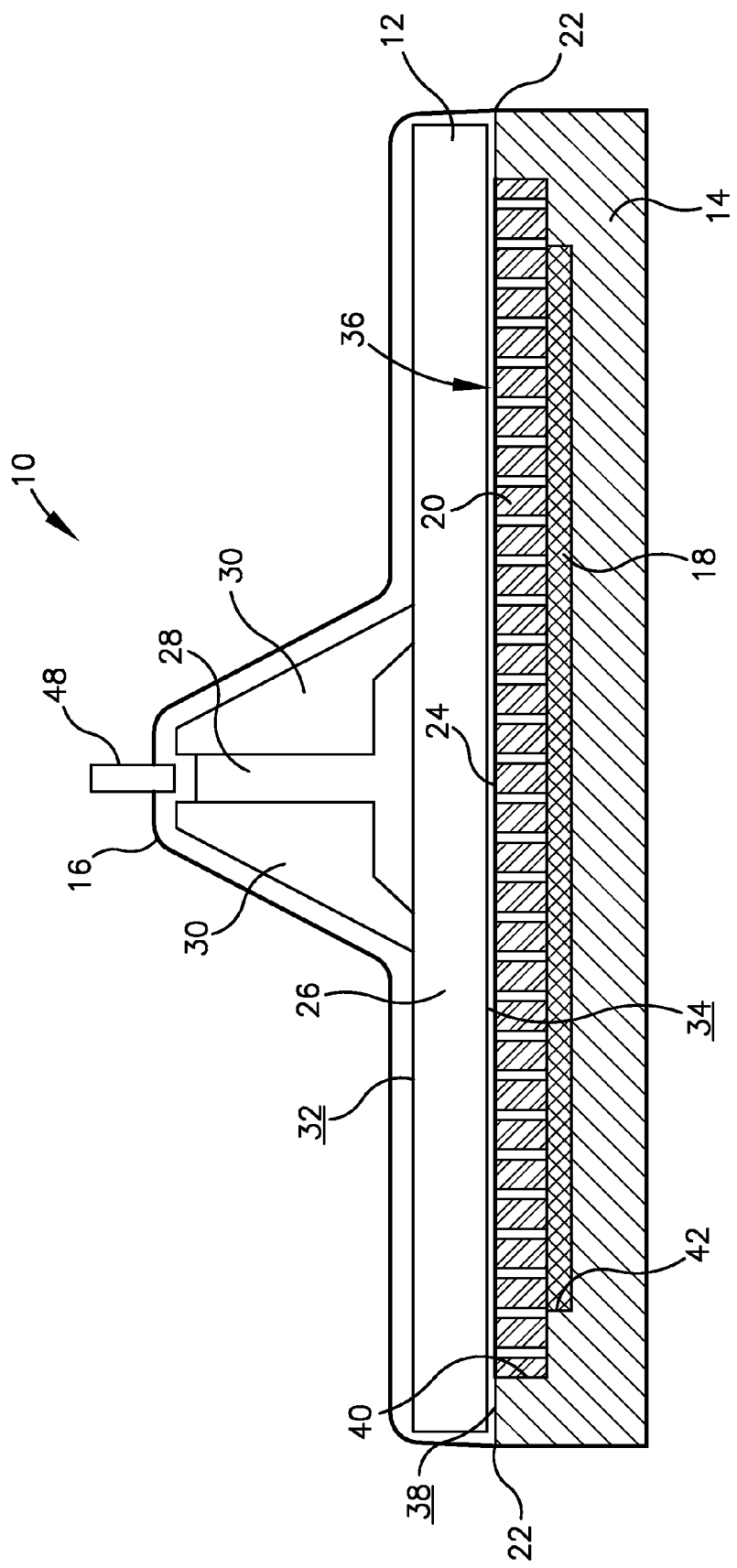
FIG. 1 is a fragmentary cross-sectional view of an assembly constructed according to various embodiments of the present invention and assembled around an uncured, uninfused composite material to be infused with liquid resin.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An assembly 10 for infusing an uncured, uninfused composite material 12 with liquid resin, thus preparing the composite material 12 to be cured into a final rigid composite part, is illustrated in FIG. 1. An embodiment of the assembly 10 may comprise a rigid tool 14, an impermeable membrane 16, a flow media 18, and a caul sheet 20. The flow media 18 and caul sheet 20 may be configured to rest in and/or on the rigid tool 14, the composite material 12 may be placed over and rest on the caul sheet 20, and the impermeable membrane 16 may be placed over the composite material 12 and hermetically sealed to the rigid tool 14, with the seal 22 forming a peripheral boundary around the composite material 12. Additionally, some embodiments of the assembly 10 may include a peel ply 24 or release fabric to prevent imprinting of the caul sheet 20 onto the composite part, as later described herein.

The composite material 12 to be shaped and infused via the assembly 10 may be any type of permeable material that may be hardened through curing, such as a plurality of composite plies or dry fibers of an uncured composite braided preform. The liquid resin may be any flowable, permeating substance or liquid. Preferably, the liquid resin is configured to aid in curing of composite materials and may comprise any epoxy, such as polyester, vinyl ester, and the like.

The composite material 12 may be shaped, infused with liquid resin, and cured as described herein to form the final rigid composite part. The resulting composite part may include three-dimensional characteristics such as height, depth, curvature, contours, features that intersect at angles up to and including ninety degrees or features that include a space between them. Such composite parts are often utilized in the manufacturing of aircraft, such as for the wing, the tail, or the fuselage of the aircraft. An example of a composite part that may be manufactured using the assembly 10 and methods disclosed herein is a portion of an aircraft wing skin 26 having one or more stringers 28 configured to be co-cured therewith, as shown in FIG. 1. Both the skin 26 and the stringers 28 may be formed from the composite material 12, with the stringers 28 being positioned between rigid stringer tooling components 30 configured to hold the stringers 28 in a desired configuration during resin infusion and curing thereof. The composite part may have two opposing surfaces referred to herein as an inner mold line (IML) 32 and an outer mold line (OML) 34. For example, if the composite part is an aircraft component, the OML 34 may be an aerodynamic surface and the IML 32 may be an inner surface within an aircraft or within the aircraft component. The stringers 28 described above are generally located on the IML 32 of the composite part.

The rigid tool 14 of the assembly 10 may be any rigid mold or rigid body having a mold surface 38 generally contoured according to a final shape of the rigid composite part. In particular, the tool 14 may be shaped to form the OML 34 of the composite part. Furthermore, the rigid tool 14 may have a plurality of grooves, channels, cavities, or recesses formed into the mold surface and configured to house at least one of the liquid resin, the flow media 18, and/or the caul sheet 20.

Figure 2:
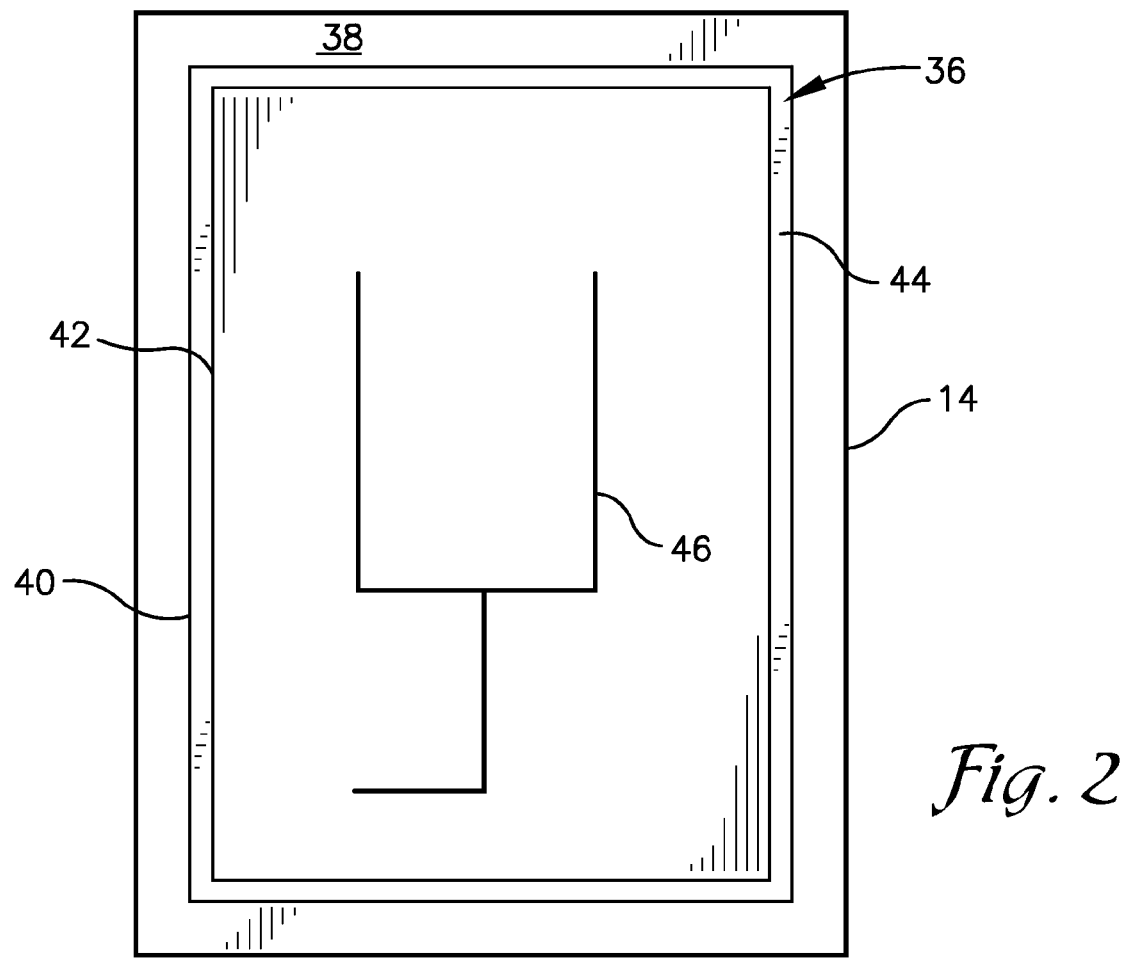
FIG. 2 is a plan view of a rigid tool of the assembly of FIG. 1.
Figure 4:
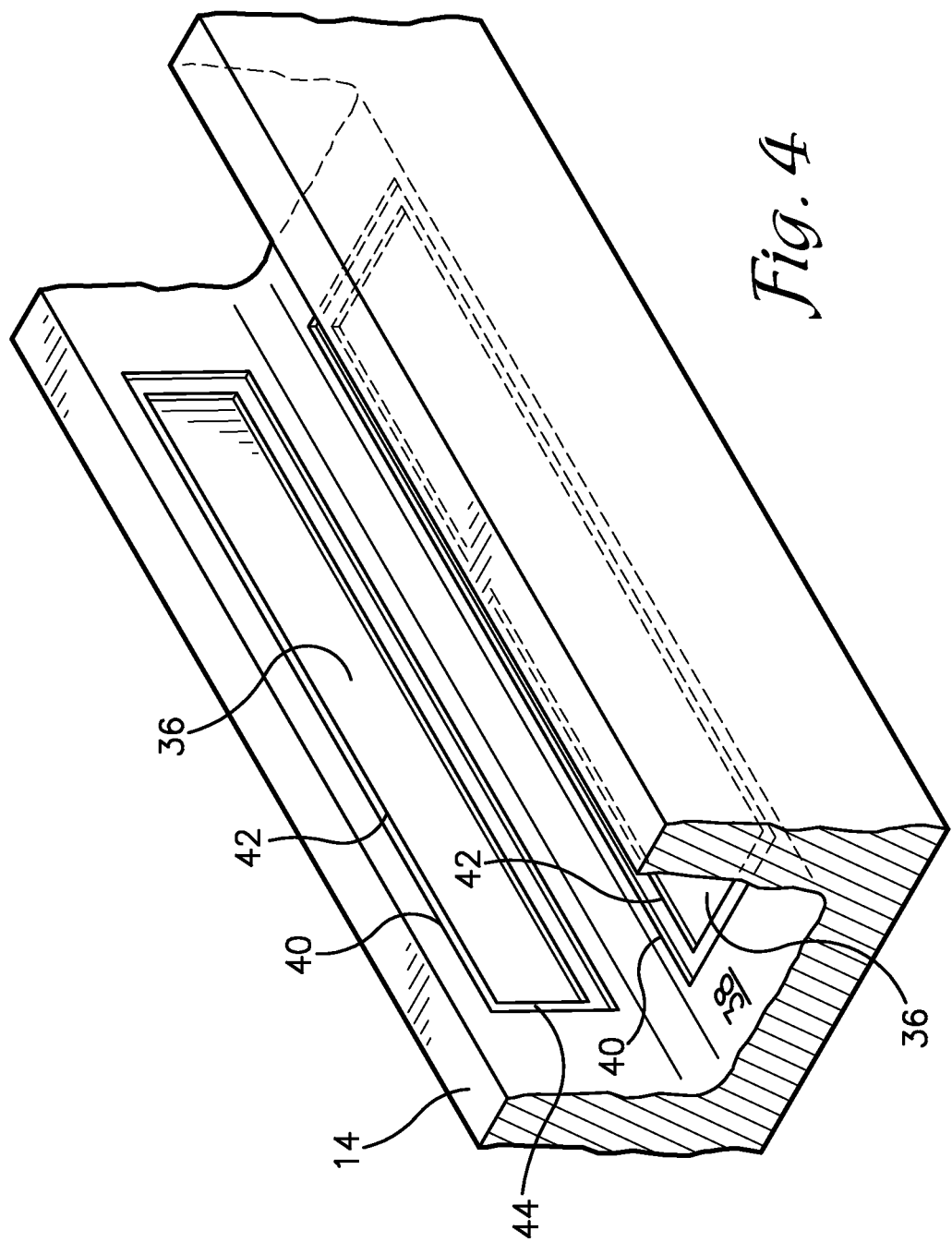
FIG. 4 is a perspective view of the rigid tool of the assembly of FIG. 1.
Figure 5:
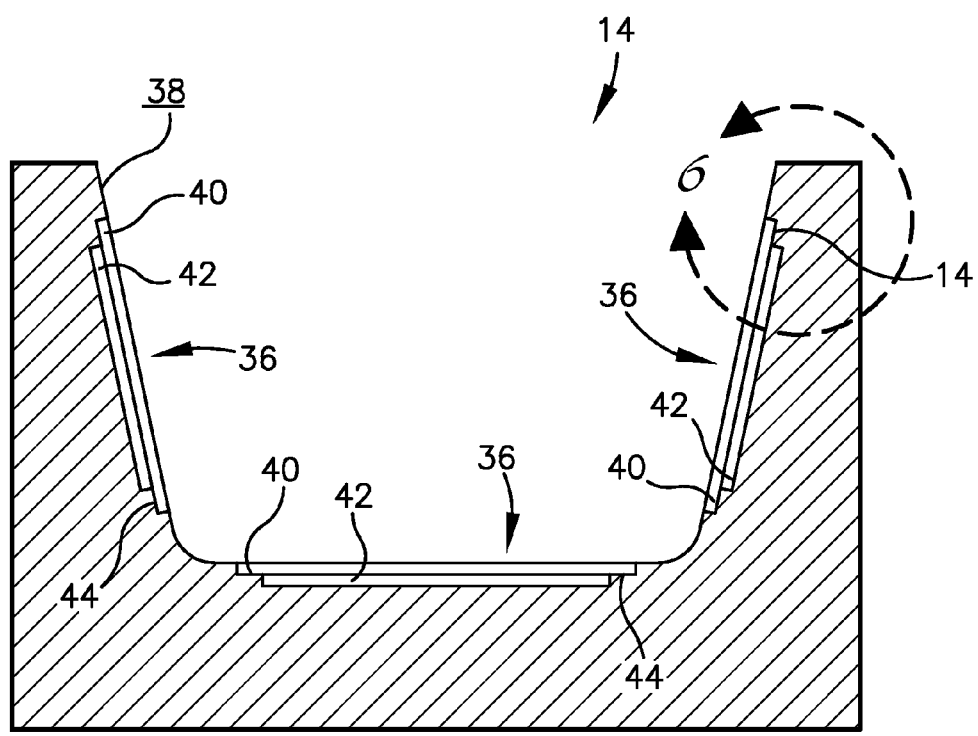
FIG. 5 is a cross-sectional view of the rigid tool of FIG. 4.
Figure 6:
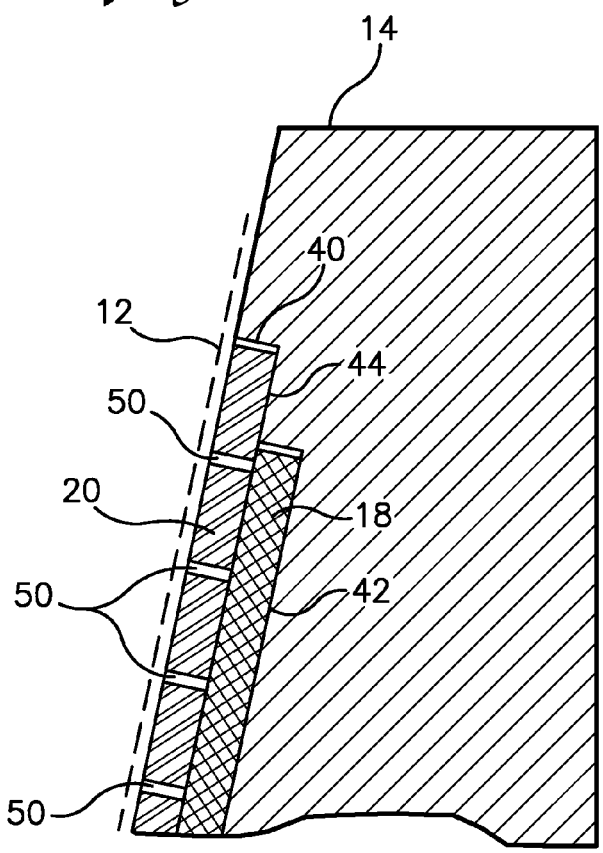
FIG. 6 is a fragmentary cross-sectional view of the rigid tool of FIG. 4, including a flow media and a perforated caul sheet of the assembly.

Specifically, the rigid tool 14 may have a plurality of recesses 36 formed therein, as illustrated in FIGS. 1, 2, and 4-6. While the manufacture of some composite parts may only require one recess, some composite parts having complex geometries may require multiple recesses, such as in the rigid tool 14 illustrated in FIGS. 4 and 5. In some embodiments of the invention, as illustrated in FIGS. 1-2, at least one of the recesses 36 may be substantially two-tiered, with a first recessed portion 40 extending a first depth and a second recessed portion 42, formed within or inward of the first recessed portion 40, extending a second depth from a surrounding area of the mold surface 38. The first recessed portion 40 may be sized and configured for receiving the caul sheet 20 therein, while the second recessed portion 42 may be sized and configured for receiving the flow media 18 therein. The first recessed portion 40 may have a larger area than the second recessed portion 42. The difference in depth and area between the first recessed portion 40 and the second recessed portion 42 forms a ledge 44, as illustrated in FIGS. 4-6. The caul sheet 20 may rest on this ledge 44 and be supported thereby. Furthermore, this ledge 44 may prevent edges or peripheral portions of the caul sheet 20 from being pressed downward between the flow media 18 and an outer boundary or side wall of the recess 36 if the flow media 20 is sized incorrectly or formed smaller than the caul sheet 20. Alternatively, one or more of the recesses 36 may include only a single tier recess with a depth sufficient for both the flow media 18 and the caul sheet 20 to fit therein.

In some embodiments of the invention, as illustrated in FIG. 2, the rigid tool 16 may also have flow channels 46 etched or otherwise formed into the mold surface 38 of the tool 14 within the second recessed portion 42, such that the flow channels 46 are covered by the flow media 20. The flow channels 46 may be filled with the liquid resin and/or may otherwise be fluidly coupled with a resin reservoir (not shown) filled with or configured to be filled with the liquid resin. The flow channels 46 may be formed in any desired size, shape, pattern, or configuration required for a given composite part in order to facilitate even distribution of the liquid resin throughout the flow media 18 and the composite material 12.

The impermeable membrane 16 may be a sheet of flexible plastic or nylon, also known in the art as a vacuum bag. However, any flexible, impermeable material known in the art for compressing under vacuum may be used without departing from the scope of the invention. The impermeable membrane 16 may have an area (length×width) larger than an area of the composite material 12, such that peripheral portions of the impermeable membrane 16 extending beyond peripheral edges of the composite material 12 may be hermetically sealed to the tool 14, using sealant tape, a mechanical seal, or any sealing methods known in the art. This may form an air-tight pocket between the impermeable membrane 16 and the tool 14.

The impermeable membrane 16 may have one or more vacuum ports 48 formed therein and configured to be fluidly coupled with a shop vacuum or some other device configured to suction atmosphere or air out from between the impermeable membrane 16 and the rigid tool 14. For example, each vacuum port 48 may be positioned and designed to correspond with a desired location of a top edge or inner-most edge of the stringer 28 to be placed underneath the impermeable membrane 16. The impermeable membrane 16 is flexible enough to compress under vacuum against the composite material 12, pressing the composite material 12 toward the caul sheet 20, flow media 18, and tool 14. In some embodiments of the invention, a breather cloth made of fiberglass, a release fabric, or peel-ply may be placed between the impermeable membrane 16 and the composite material 12 to help pull resin through the material and allow air to be evacuated from between the impermeable membrane 16 and the tool 14.

The flow media 18 may be made of nylon, plastic, or metal and having a high permeability, such as a resin distribution mesh. The flow media 18 may be configured to be placed between the caul sheet 20 and the tool 14 to allow the liquid resin to flow through it and subsequently be evenly dispersed throughout the composite material 12. For example, the flow media 18 may be sized and shaped to substantially correspond to the size and shape of the second recessed portion 42 described above. The flow media 18 may thus reside within the second recessed portion 42 above the flow channels 46 and be configured to evenly disperse the liquid resin from the flow channels 46, through the caul sheet 20, to the composite material 12.

In some embodiments of the invention, the flow media 18 may have a compression strength and modulus sufficient to resist excessive crushing by the caul sheet 20 and the composite material 12 during vacuum compression of the impermeable membrane 16. However, some compression of the flow media 18 may be allowed without departing from the scope of the invention, as long as the caul sheet 20 remains within an allowed tolerance range of a nominal geometry while forming the composite part. Additionally or alternatively, the flow media 18 may have support features periodically extending therethrough or formed therein to resist crushing by the caul sheet 20 during vacuum compression of the impermeable membrane 16 while still allowing the liquid resin to flow substantially evenly through the flow media 18.

Figure 3:
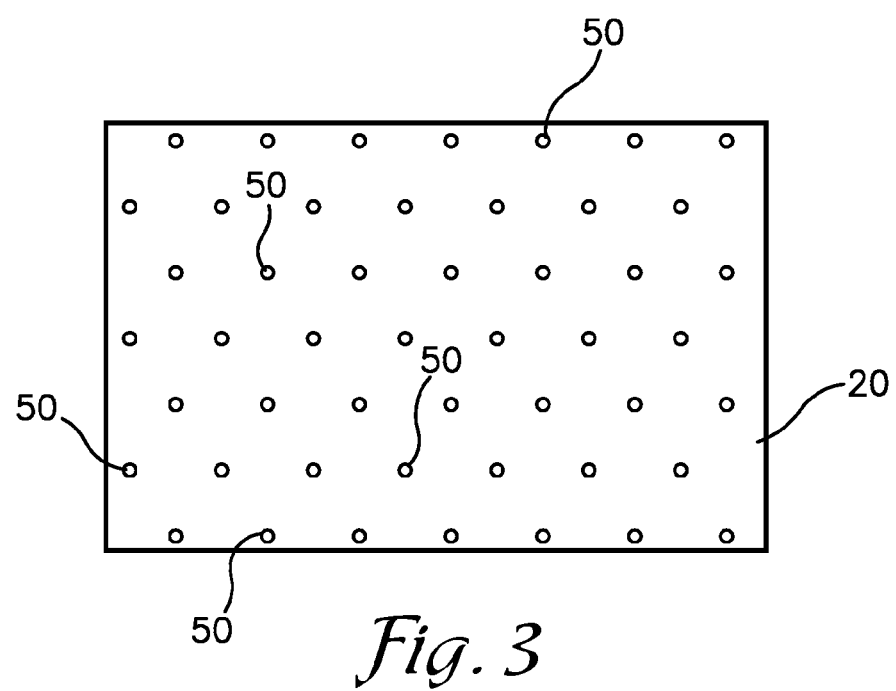
FIG. 3 is a plan view of a caul sheet of the assembly of FIG. 1, illustrating a pattern of holes or perforations formed therethrough.

The caul sheet 20 may be a rigid or semi-rigid caul sheet or caul plate and may be formed of any material that can resist curing temperatures of the composite material 12 and has a coefficient of thermal expansion sufficient to remain within a desired range of dimensions to form the composite part. For example, the caul sheet 20 may be made of metals like aluminum or steel, carbon-reinforced plates, glass, plastic, fiber-reinforced plastic, or polytetrafluoroethylene (PTFE). The caul sheet 20 may have a plurality of holes or perforations formed therein. As illustrated in FIG. 3. Alternatively, the caul sheet 20 may be made of a porous or permeable material.

Whether made with holes or out of porous material, the caul sheet 20 is configured to allow the liquid resin to flow therethrough without imprinting onto the composite material 12 during the resin infusion and/or curing process. Specifically, the caul sheet 20 may have at least one substantially smooth surface configured to face the composite material 12. The caul sheet 20 may be sized and shaped to substantially correspond to the size and shape of the first recessed portion 40 described above, such that the caul sheet 20 rests substantially flush with portions of the mount surface 38 outward of the recess 36 and immediately adjacent to the recess 36. The caul sheet 20 may have any desired thickness without departing from the scope of the invention. For example, the caul sheet 20 may have a thickness in a range of 0.2 mm to 15 mm or, more specifically, a thickness of approximately 1 mm. The caul sheet 20 may, in some embodiments of the invention, have a surface area less than a surface area of the composite material 12, such that the composite material 12 may overlap boundaries of the caul sheet 20 and the first recessed portion 40 when placed over the caul sheet 20.

In some embodiments of the invention, the caul sheet 20 may have holes 50 formed therein in any desired pattern of distribution. For example, the holes 50 may be formed in a series of offsetting rows and columns, as illustrated in FIG. 3. The holes 50 may have any shape, size, or area without departing from the scope of the invention. For example, the holes 50 may have a diameter in a range of 1 mm to 3 mm or, more specifically, approximate 2 mm in diameter. Specifically, the holes 50 may be sized small enough such that imprints of the holes 50 are not formed into the composite material 12 or the OML of the resulting composite part.

The peel-ply 24 may be any peel ply, breather cloth (e.g., such as a breather cloth made of fiberglass), or a release fabric, as known in the art. The peel ply 24 may be placed between the composite material 12 and the caul sheet 20 to prevent the holes of the caul sheet and/or any gaps between the tool 14 and the caul sheet 20 from imprinting onto the composite part's aerodynamic surface or OML 34. Additionally or alternatively, the peel ply 24 may also assist in preventing the composite material 12 from sticking to the caul sheet 20 during compression and cure.

In use, the assembly 10 is assembled around the composite material 12, as described below, and vacuum is applied via the vacuum ports 48 of the impermeable membrane 16. In some embodiments of the invention, a connection (not shown) between the resin reservoir and the flow channels 46 may be opened once a certain desired vacuum level within the assembly 10 is reached, thus filling the flow channels 46 with the liquid resin. Specifically, the liquid resin is pulled out of the resin reservoir by the vacuum applied to the vacuum ports 48. The liquid resin may continue flowing toward the vacuum ports 48 until vacuum is disconnected or turned off or until the vacuum port 48 is closed. While the vacuum is applied to the vacuum ports 48 and the resin reservoir is fluidly coupled with the flow channels 46, the liquid resin may flow from the flow channels 46 through the flow media 18, through the caul sheet 20, and throughout the composite material 12. For example, the liquid resin may flow through the skin 26 and then through the composite stringer 28 resting on the IML 32 of the composite material 12 until it reaches the vacuum port 48 aligned with the stringer 28, as illustrated in FIG. 1. Operation of the vacuum ports 48 may be timed according to how long it takes for the corresponding stringer 28 to be fully infused with the liquid resin, such that the vacuum port 48 is closed once the stringer 28 is fully infused with the liquid resin. A flow front of the liquid resin may be affected by the location of the flow channels 46, the location of the vacuum ports 48, and the size, shape, and configuration of the composite material 12.

Figure 7:
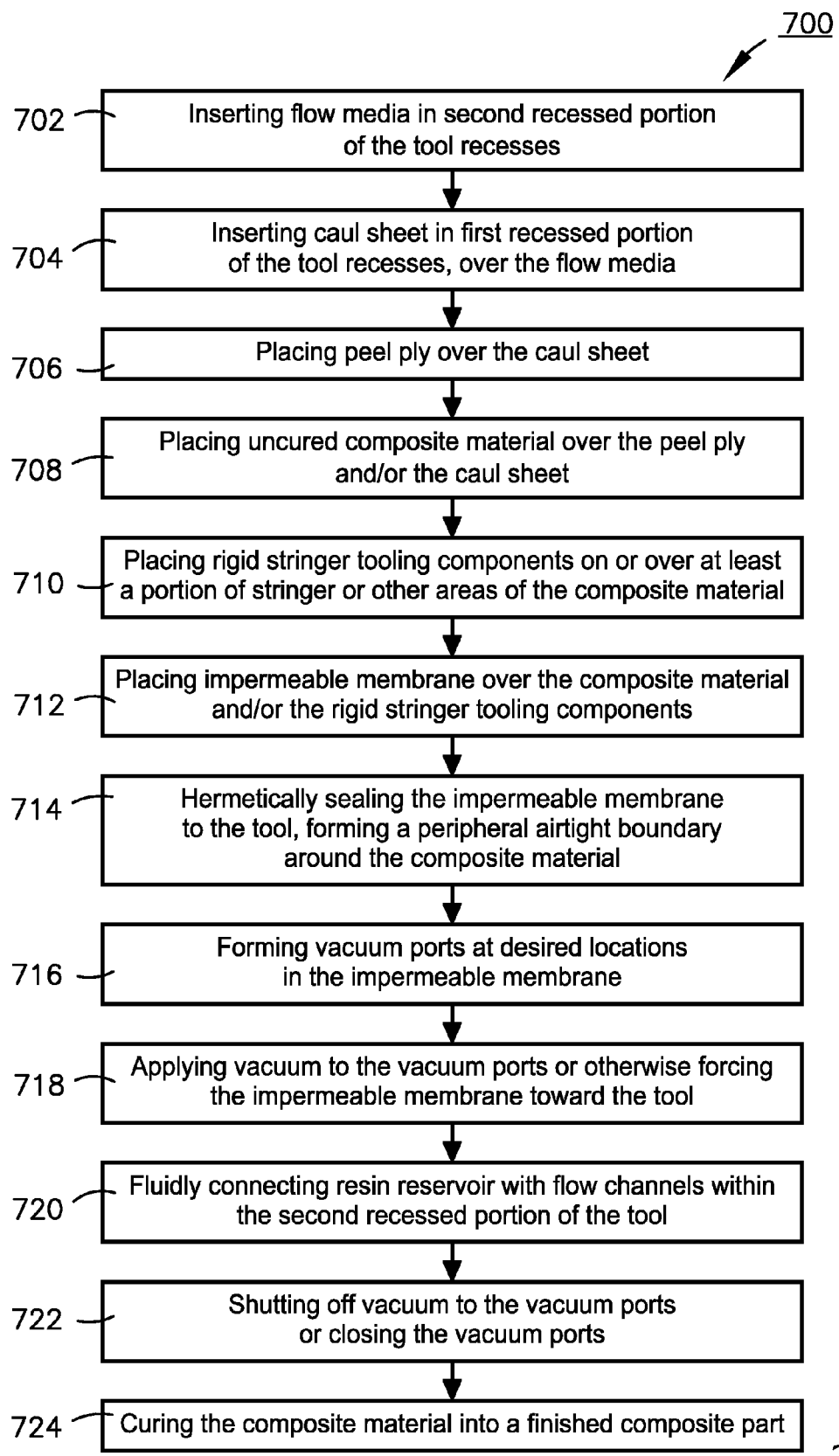
FIG. 7 is a flow chart of a method of infusing a liquid resin into a composite material in accordance with an embodiment of the invention.

The flow chart of FIG. 7 depicts the steps of an exemplary method 700 of infusing a complex composite part with liquid resin in more detail. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved. Additionally, some blocks may be omitted without departing from the scope of the invention.

As illustrated in FIG. 7, the method 700 may comprise the steps of inserting the flow media 18 in the second recessed portion 42 of one of the recesses 36 in the tool 14, as depicted in block 702, then inserting the caul sheet 20 in the first recessed portion 40 of one of the recesses 36 in the tool 14, as depicted in block 704. This sandwiches the flow media 18 between the tool 14 and the caul sheet 20. Next, the method may comprise placing the peel ply 24 over the caul sheet 20, as depicted in block 706. However, the peel ply 24 may be omitted without departing from the scope of the invention. Then the method 700 may comprise a step of placing the composite material 12 over the peel ply 24 and/or the caul sheet 20, as depicted in block 708 such that the caul sheet 20 is sandwiched between the flow media 18 and the composite material 12. As discussed above, the composite material 12 may include the composite skin 26 and the composite stringer 28 resting on the IML 32 of the composite material 12 or the resulting composite part.

The method 700 may further comprise placing the rigid stringer tooling components 30 on or over at least a portion of the stringer 28 or other areas of the composite material 12, as depicted in block 710, to properly form the stringer 28 and prevent it from collapsing during vacuum compression and cure. Next, the impermeable membrane 16 may be placed over the composite material 12 and/or the rigid stringer tooling components 30, as depicted in block 712, and hermetically sealed to the tool 14, as depicted in block 714, thereby forming a peripheral airtight boundary around the composite material 12. As noted above, the vacuum ports 48 may be configured to align with desired locations of the stringer 28. However, in some embodiments of the invention, the method 700 may further include forming the vacuum ports 48 at desired locations in the impermeable membrane 16, as depicted in block 716, such as in alignment with the stringer 28.

The method 700 may include a step of applying vacuum to the vacuum ports 48, as depicted in block 718, or otherwise evacuating air and atmosphere through the vacuum ports 48, such that the impermeable membrane 16 compresses against the composite material 12 and/or the rigid stringer tooling components 30. This compresses the composite material 12 against the caul sheet 20. Other methods of creating a pressure differential between the atmosphere sealed between the impermeable membrane 16 and the tool 14 and the atmosphere outward thereof may be employed without departing from the scope of the invention.

The method 700 may then comprise a step of fluidly connecting the resin reservoir with the flow channels 46 and/or the flow media 18, as depicted in block 720. For example, the connection between the resin reservoir and the flow channels 46 may be opened and the liquid resin may flow from the resin reservoir, through the flow media 18, through the holes 50 or perforations of the caul sheet 20, and through the composite material 12 before reaching the vacuum ports 48. Finally, the method 700 may include the steps of shutting off vacuum to the vacuum ports 48 or closing the vacuum ports 48, as depicted in block 722, and curing the composite material 12 into the composite part, as depicted in block 724. The composite material 12 compressed under vacuum by the impermeable membrane 16 may be heated to a sufficient cure temperature based on the size and type of composite material 12. For example, the composite material 12 may be cured at a temperature of approximately 180 degrees Celsius.

The caul sheet 20 leaves a smooth OML 34 on the resulting composite part by separating the flow media 18 from the OML 34. Thus, the flow media 18 does not imprint onto the composite part or leave a wavy surface on the OML 34. As noted above, the holes 50 or perforations are sufficiently small so as to also not leave any imprint or marking on the OML 34 of the composite part. The peel ply 24 also assists in minimizing or eliminating any imprinting caused by the caul sheet 20 and/or the tool 14.

As noted above and illustrated in FIGS. 1 and 6, a surface area of the caul sheet 20 may be less than a surface area of the composite material 12 or the composite skin 26, such that the composite material overlaps edges of the caul sheet 20 and portions of the composite material 12 rest on the surrounding area of the mold surface 38, outward of the recesses 36. In some instances, the composite material 12 is placed over a plurality of caul sheets 20 in a plurality of recesses 36. Although the caul sheet 20 may be sized and shaped to rest substantially flush with the surrounding area of the mold surface 38, an area between the caul sheet 20 and an edge formed between the mold surface 38 and the first recessed portion 40 may imprint onto the composite material 12, leaving an undesired imprint on the OML 34. However, effects of this caul sheet 20 boundary imprinting on the OML 34 may be reduced or eliminated by the use of the peel ply 24 placed between the caul sheet 20 and the composite material 12. Ideally, the peel ply 24 may be sized to match a surface area of the composite material 12, so that both the composite material 12 and the peel ply 24 overlap the caul sheet 20 boundary. Without the peel ply 24, the holes 50 in the caul sheet 20 and any gaps between the caul sheet 20 and the tool 14 may be seen as resin residue on the composite part OML 34, which may be undesirable for an aerodynamic surface. After cure, the peel ply 24 may be peeled off of the composite part, leaving a smooth OML 34 on the composite part.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of infusing composite material with liquid resin to form a composite part, the method comprising:
    placing a flow media into a recess formed into a surface of a rigid tool, wherein the recess is selectively fluidly coupled with a resin reservoir having liquid resin therein;
    placing a caul sheet into the recess, thereby sandwiching the flow media between the caul sheet and the rigid tool, wherein the caul sheet has a plurality of holes or perforations formed therein or is made of a porous material;

placing composite material over the caul sheet;

placing an impermeable membrane over the composite material;

sealing the impermeable membrane to the rigid tool around a periphery of the composite material;

applying a pressure differential sufficient to compress the impermeable membrane toward the composite material and the rigid tool by vacuuming air or atmosphere out from between the impermeable membrane and the rigid tool; and opening a connection between the resin reservoir and the recess, such that the liquid resin is pulled from the resin reservoir, through the flow media, through the caul sheet, and throughout the composite material by vacuum.

2. The method of claim 1, further comprising placing the caul sheet into a first recessed portion of the recess and placing the flow media into a second recessed portion of the recess, wherein the first recessed portion extends a first depth from the surface of the rigid tool and the second recessed portion is formed inward of the first recessed portion and extends a second depth from the surface of the rigid tool.

3. The method of claim 1, further comprising placing a peel ply over the caul sheet between the caul sheet and the composite material.

4. The method of claim 1, wherein the composite material overlaps an edge at which the surface of the rigid tool meets the recess, such that an outer portion of the composite material rests on the surface of the rigid tool and an inner portion of the composite material rests on the caul sheet.

5. The method of claim 1, wherein the composite material comprises a composite skin and at least one composite stringer, wherein the impermeable membrane has at least one vacuum port aligned with the at least one stringer, wherein the step of applying the pressure differential comprises vacuuming air or atmosphere out through the vacuum port from between the impermeable membrane and the rigid tool.

6. The method of claim 1, further comprising placing rigid tooling components onto the composite material and placing the impermeable membrane over the rigid tooling components and the composite material.

7. The method of claim 6, wherein an outer mold line (OML) surface of the composite part is formed by the rigid tool and the caul sheet and an inner mold line (IML) surface of the composite part is formed by rigid tooling components and the impermeable membrane.

8. A method of infusing composite material with liquid resin to form a composite part having an inner mold line (IML) surface and an outer mold line (OML) surface opposite the IML surface, the method comprising:

placing a flow media into a recess formed into a surface of a rigid tool, wherein the recess is fluidly coupled with a resin reservoir having liquid resin therein, wherein the recess is two-tiered, having a first recessed portion extending a first depth from the surface of the rigid tool and a second recessed portion, inward of the first recessed portion and having an area less than or equal to the first recessed portion, that extends a second depth from the surface of the rigid tool, wherein the placing of the flow media into the recess comprises placing the flow media into the second recessed portion;

placing a caul sheet into the first recessed portion, thereby sandwiching the flow media between the caul sheet and the rigid tool, wherein the caul sheet has a plurality of holes or perforations formed therein and rests on a ledge extending between the first recessed portion and the second recessed portion;

placing composite material over the caul sheet;

placing a flexible impermeable membrane over the composite material;

sealing the impermeable membrane to the rigid tool around a periphery of the composite material; and vacuuming air or atmosphere from between the impermeable membrane and the rigid tool by an amount sufficient to compress the impermeable membrane toward the composite material and the rigid tool, such that the liquid resin is pulled from the resin reservoir, through the flow media, through the holes or perforations of the caul sheet, and throughout the composite material toward the vacuum port.

9. The method of claim 8, further comprising placing a peel ply over the caul sheet between the caul sheet and the composite material.

10. The method of claim 8, wherein the composite material comprises a composite skin and at least one composite stringer.

11. The method of claim 10, further comprising aligning the at least one vacuum port with the at least one composite stringer.

12. The method of claim 10, further comprising supporting the composite stringer with rigid stringer tooling components and placing the impermeable membrane over the rigid stringer tooling components and the composite material.

13. The method of claim 12, wherein the OML surface of the composite part is formed by the rigid tool and the caul sheet and the IML surface of the composite part is formed by rigid stringer tooling components and the impermeable membrane.

14. An assembly for infusing composite material with liquid resin to form a composite part having a complex geometry including an inner mold line (IML) surface and an outer mold line (OML) surface opposite the IML surface, the composite material comprising a composite skin and at least one composite stringer, and the assembly comprising:

a rigid tool comprising a mold surface having a two-tiered recess formed therein including a first recessed portion and a second recessed portion, wherein the second recessed portion is formed inward of the first recessed portion and has a greater depth from the surface of the rigid tool than a depth of the first recessed portion, wherein the two-tiered recess is configured to be fluidly coupled with a resin reservoir having liquid resin therein;

a flow media placed within the second recessed portion of the two-tiered recess of the tool;

a caul sheet placed within the first recessed portion of the two-tiered recess of the tool, such that the flow media is sandwiched between the caul sheet and the tool, wherein the caul sheet has a plurality of holes or perforations formed therein, wherein a surface of the caul sheet corresponds with the OML surface of the composite part to be formed thereon;

a flexible impermeable membrane wherein the impermeable membrane is placed over the two-tiered recess, the flow media, the caul sheet, and the composite material and sealed to the rigid tool, cooperatively forming a pocket with the rigid tool around a periphery of the two-tiered recess; and a vacuum port formed through at least one of the impermeable membrane and the rigid tool, wherein vacuuming air or atmosphere through the vacuum port from between the impermeable membrane and the rigid tool compresses the impermeable membrane toward the composite material and the rigid tool, such that the liquid resin is pulled from the resin reservoir, through the flow media, through the holes or perforations of the caul sheet, and throughout the composite material toward the vacuum port.

15. The assembly of claim 14, further comprising rigid stringer tooling components supporting the composite stringer, wherein the impermeable membrane is positioned over the rigid stringer tooling components and the composite material, and the at least one vacuum port is aligned with the at least one composite stringer.

16. The assembly of claim 14, further comprising a peel ply positioned on the caul sheet and configured to be a barrier between the composite material and the caul sheet such that the OML surface is not imprinted by the caul sheet or the rigid tool during curing of the composite material into the composite part.

17. A method of infusing composite material with liquid resin to form a composite part, the method comprising:

placing a flow media into a recess formed into a surface of a rigid tool, wherein the recess is selectively fluidly coupled with a resin reservoir having liquid resin therein;

placing a caul sheet into the recess, thereby sandwiching the flow media between the caul sheet and the rigid tool, wherein the caul sheet has a plurality of holes or perforations formed therein or is made of a porous material;

placing composite material over the caul sheet;

placing a peel ply over the caul sheet between the caul sheet and the composite material;

placing an impermeable membrane over the composite material;

sealing the impermeable membrane to the rigid tool around a periphery of the composite material; and applying a pressure differential sufficient to compress the impermeable membrane toward the composite material and the rigid tool.

* * * * *